(12) United States Patent
Sellers et al.

(10) Patent No.: US 8,459,665 B2
(45) Date of Patent: Jun. 11, 2013

(54) FOLDABLE STROLLER FRAME

(75) Inventors: Gregory S. Sellers, Christiana, PA (US); Robert E. Haut, West Chester, PA (US)

(73) Assignee: Wonderland Nurserygoods Company Limited, Central (HK)

( * ) Notice: Subject to any disclaimer, the term of this patent is extended or adjusted under 35 U.S.C. 154(b) by 175 days.

(21) Appl. No.: 13/115,518

(22) Filed: May 25, 2011

(65) Prior Publication Data
US 2011/0291388 A1 Dec. 1, 2011

Related U.S. Application Data

(60) Provisional application No. 61/396,442, filed on May 27, 2010.

(51) Int. Cl.
*B62B 7/00* (2006.01)
(52) U.S. Cl.
USPC .......................... 280/47.38; 280/647; 280/650
(58) Field of Classification Search
USPC ................. 280/33.993, 47.38, 639, 642, 643, 280/644, 647, 648, 649, 650, 658
See application file for complete search history.

(56) References Cited

U.S. PATENT DOCUMENTS

| | | | |
|---|---|---|---|
| 5,244,223 A * | 9/1993 | Uchiyama | 280/250.1 |
| 2005/0225056 A1 | 10/2005 | Dotsey et al. | |

FOREIGN PATENT DOCUMENTS

| | | |
|---|---|---|
| CN | 201154721 Y | 11/2008 |
| CN | 101443222 A | 5/2009 |

* cited by examiner

*Primary Examiner* — John Walters
*Assistant Examiner* — James Triggs
(74) *Attorney, Agent, or Firm* — Merchant & Gould P.C.

(57) ABSTRACT

A foldable stroller frame includes a seat frame assembly, and a leg tube assembly including a front leg tube, a rear leg tube, and a pivot joint connected between the front and rear leg tubes and connected pivotally to the seat frame assembly. A link is connected pivotally to a handle tube at one end thereof and to the pivot joint at the other end. Two supporting tubes are connected respectively to the seat frame assembly and the leg tube assembly. A drive member is connected among the rear leg tube, the handle tube, and the supporting tubes, in such a manner to allow for rotation of the handle tube relative to the drive member. When said handle tube is rotated relative to said drive member, said drive member is activated to result in rotation of said seat frame and leg tube assembly, and said stroller frame is converted between unfolded and fully folded states.

9 Claims, 6 Drawing Sheets

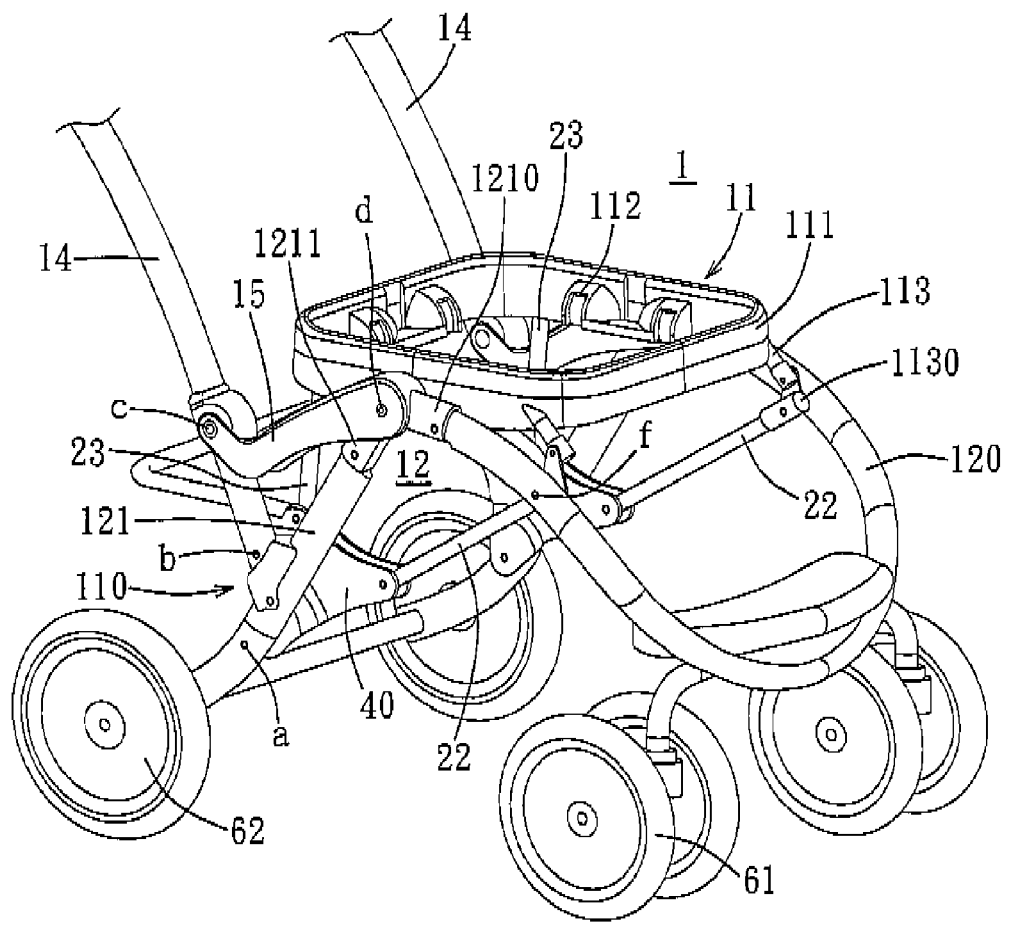
F I G. 1

FOLDABLE STROLLER FRAME

CROSS-REFERENCE TO RELATED APPLICATION

This application claims priority of U.S. provisional application No. 61/396,442, filed on May 27, 2010.

BACKGROUND OF THE INVENTION

1. Field of the Invention

This invention relates to a stroller frame, and more particularly to a foldable stroller frame that is easy to unfold and fold.

2. Description of the Related Art

A conventional stroller frame includes a seat frame assembly, a plurality of tubes and plastic components. The tubes include a front leg tube, a rear leg tube, and a handle tube. Typically, the seat frame assembly is designed to allow a stroller seat or a car safety seat to be mounted thereon. A plurality of pivot pins are disposed for interconnecting the tubes to form a foldable structure. A locking mechanism is disposed between two of the tubes, and is operable to allow for unfolding and folding operation of the stroller frame.

Typically, the locking mechanism can be converted between locking and release states by operating a one-hand folding mechanism with one hand. The locking mechanism may include a locking member disposed movably within the handle tube, and a lock seat disposed on another tube, e.g., the rear leg tube. The locking member can be moved toward or away from the lock seat. When the locking member is released from the lock seat, unfolding and folding operation of the stroller frame is allowed. When the locking member is locked on the lock seat, unfolding and folding operation of the stroller frame is prevented.

However, the aforesaid conventional stroller frame has a disadvantage. That is, when the stroller frame is not in either an unfolded or fully folded state (i.e., is in a semi-folded state), if a load is applied to the seat frame assembly, e.g., as a result of climbing of an infant onto the stroller seat or the car safety seat, the handle tube and the rear leg tube may move toward each other, so that the stroller frame is overturned, which may cause damage to the infant.

SUMMARY OF THE INVENTION

The object of this invention is to provide a foldable stroller frame that has a tendency to convert into an unfolded state when it is in a semi-folded state, so as to promote safety during use of the stroller frame.

According to this invention, there is provided a foldable stroller frame comprising:

a seat frame assembly;

a leg tube assembly including a front leg tube, a rear leg tube, and a pivot joint connected between the front and rear leg tubes and connected pivotally to the seat frame assembly;

a handle tube;

a link connected pivotally to the handle tube at one end thereof and to the pivot joint at the other end;

two supporting tubes connected respectively to the seat frame assembly and the leg tube assembly; and a drive member connected pivotally among the rear leg tube, the handle tube, and the supporting tubes, in such a manner to allow for rotation;

wherein, when the handle tube is rotated relative to the drive member, the drive member is activated to result in rotation of the seat frame assembly and the leg tube assembly, and the stroller frame is converted between unfolded and fully folded states.

BRIEF DESCRIPTION OF THE DRAWINGS

These and other features and advantages of this invention will become apparent in the following detailed description of a preferred embodiment of this invention, with reference to the accompanying drawings, in which:

FIG. 1 is a fragmentary perspective view of the preferred embodiment of a stroller frame according to this invention;

DETAILED DESCRIPTION OF THE PREFERRED EMBODIMENT

Figure 6:
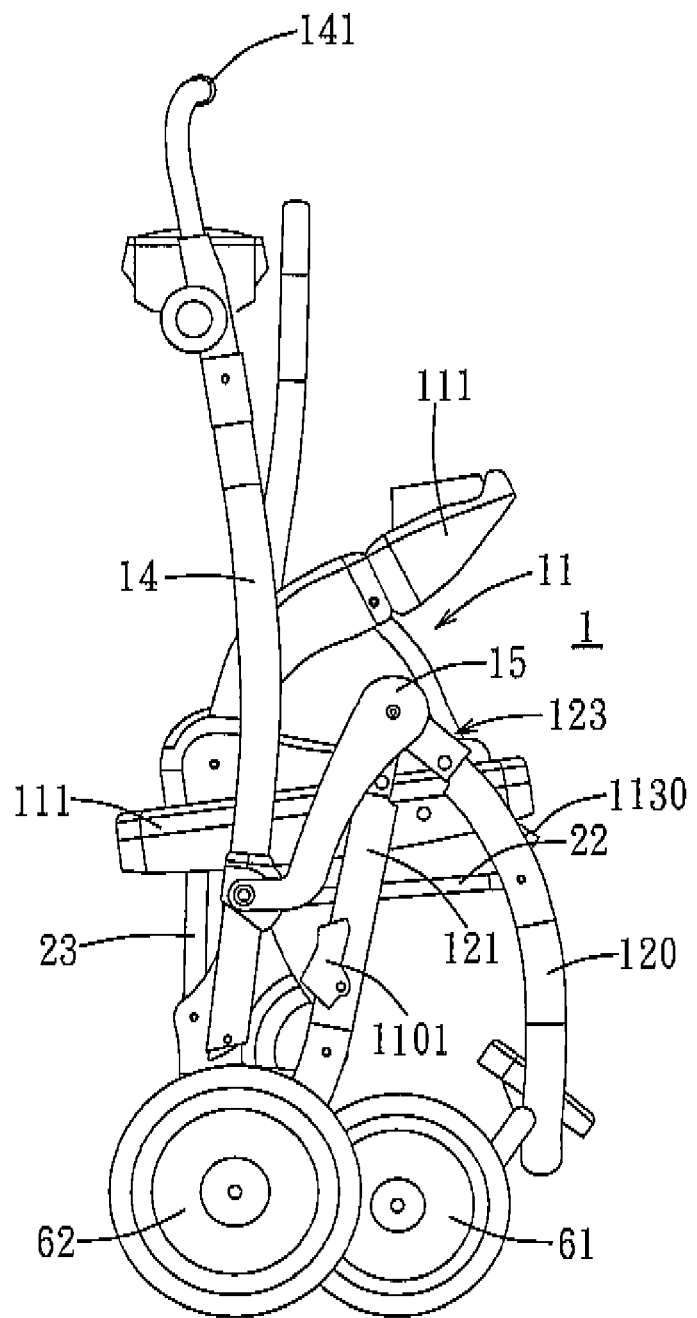
FIG. 6 is a side view of the preferred embodiment when it is in a fully folded state.

Referring to FIGS. 1 to 5, the preferred embodiment of a foldable stroller frame 1 according to this invention includes a seat frame assembly 11, a leg tube assembly 12 consisting of a front leg tube 120 and a rear leg tube 121, a handle tube 14, a locking mechanism 110 for locking the stroller frame in an unfolded state, and a one-hand folding device (not shown) operable for activating the locking mechanism 110. With particular reference to FIG. 1, the seat frame assembly 11 includes a rectangular frame body 111, and a mounting member 112 disposed inside of the rectangular frame body 111 for mounting a stroller seat (not shown) or a car safety seat (not shown) on the rectangular frame body 111. Two seat frame connecting tubes 113 are disposed respectively and fixedly on two opposite sides of a front end of the rectangular frame body 111. Each of the connecting tubes 113 is connected to an inclined front supporting tube 22 by a first pivot joint 1130. Two rear supporting tubes 23 are connected respectively and fixedly to two opposite sides of a rear end of the rectangular frame body 111. Due to the presence of the front and rear supporting tubes 22, 23, when the stroller frame 1 is fully folded, as shown in FIG. 6, the front and rear leg tubes 120, 121 are generally parallel to the handle tube 14, such that the stroller frame 1 is upright, and front and rear wheels 61, 62 are in contact with the ground surface.

Each of the front and rear leg tubes 120, 121 is a U-shaped tube, and has two ends disposed respectively at two sides of the seat frame assembly 11. Each of the ends of the front leg tube 120 is connected to the corresponding end of the rear leg tube 121 by a second pivot joint 123. The second pivot joint 123 includes two connecting tubes 1210, 1211 that are interconnected pivotally and that are connected respectively and fixedly to the front and rear leg tubes 120, 121, e.g., by soldering.

Each of the second pivot joints 123 is connected pivotally to the handle tube 14 by a link 15. The locking mechanism 110 includes a locking member 1100 disposed movably within the handle tube 14, and a lock seat 1101 disposed on the rear leg tube 121. Through operation of a one-hand folding mechanism (not shown) in a known manner, a cable 1110 is activated to move the locking member 1100 within the handle tube 14. Hence, the locking member 1100 can be locked on the lock seat 1101 for locking the stroller frame 1 in the unfolded state, or removed from the lock seat 1101 so as to allow for unfolding or folding operation of the stroller frame 1.

Figure 2:
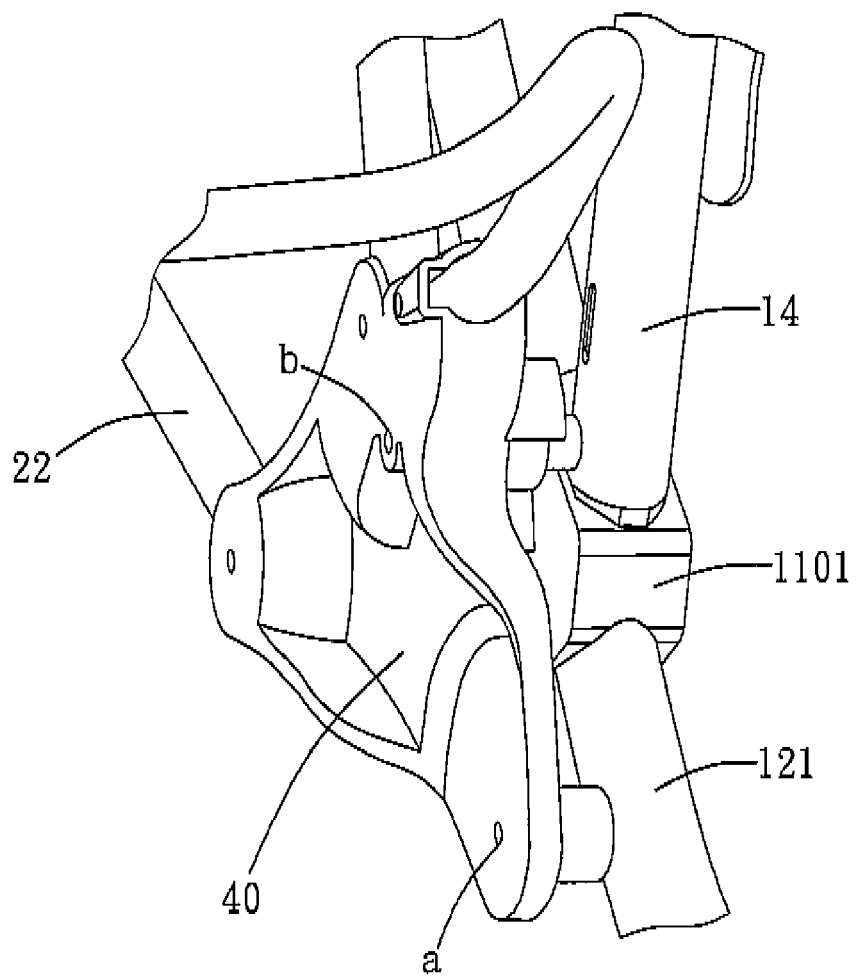
FIG. 2 is a fragmentary rear perspective view of the preferred embodiment.
Figure 3:
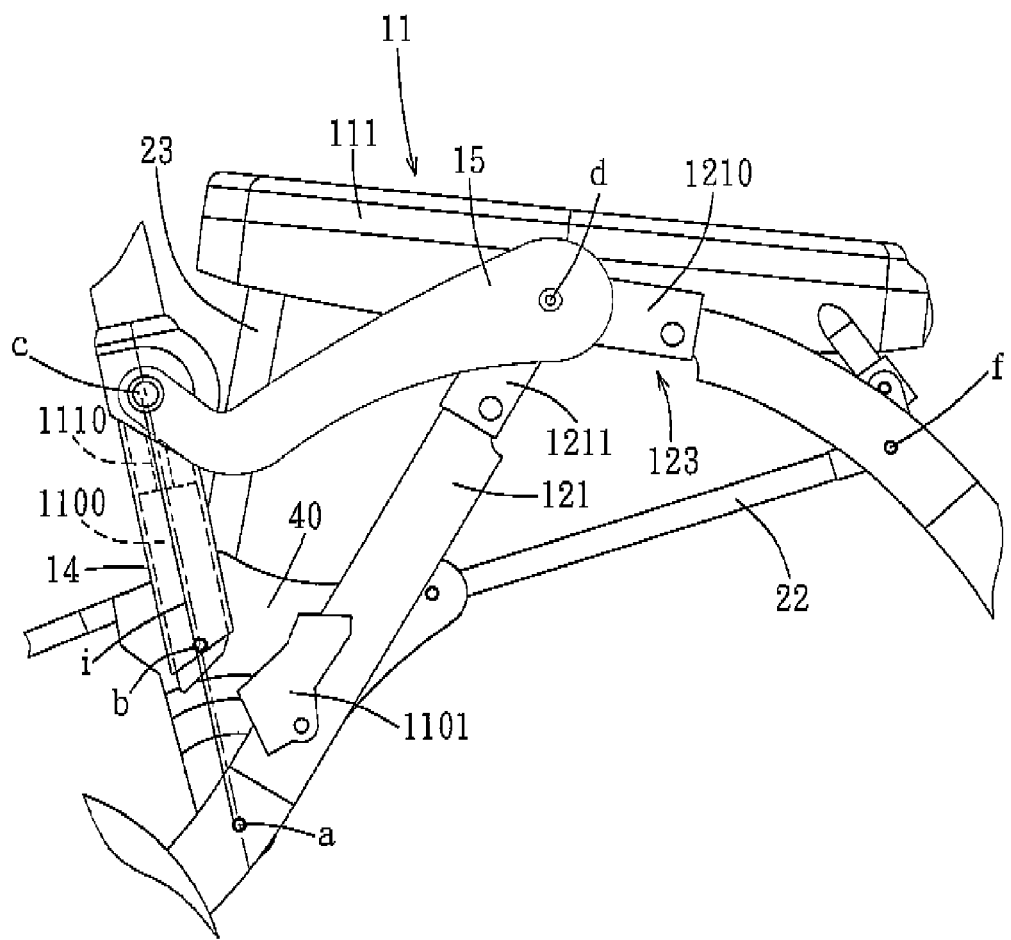
FIG. 3 is a fragmentary side view of the preferred embodiment when it is in a semi-folded state.
Figure 4:
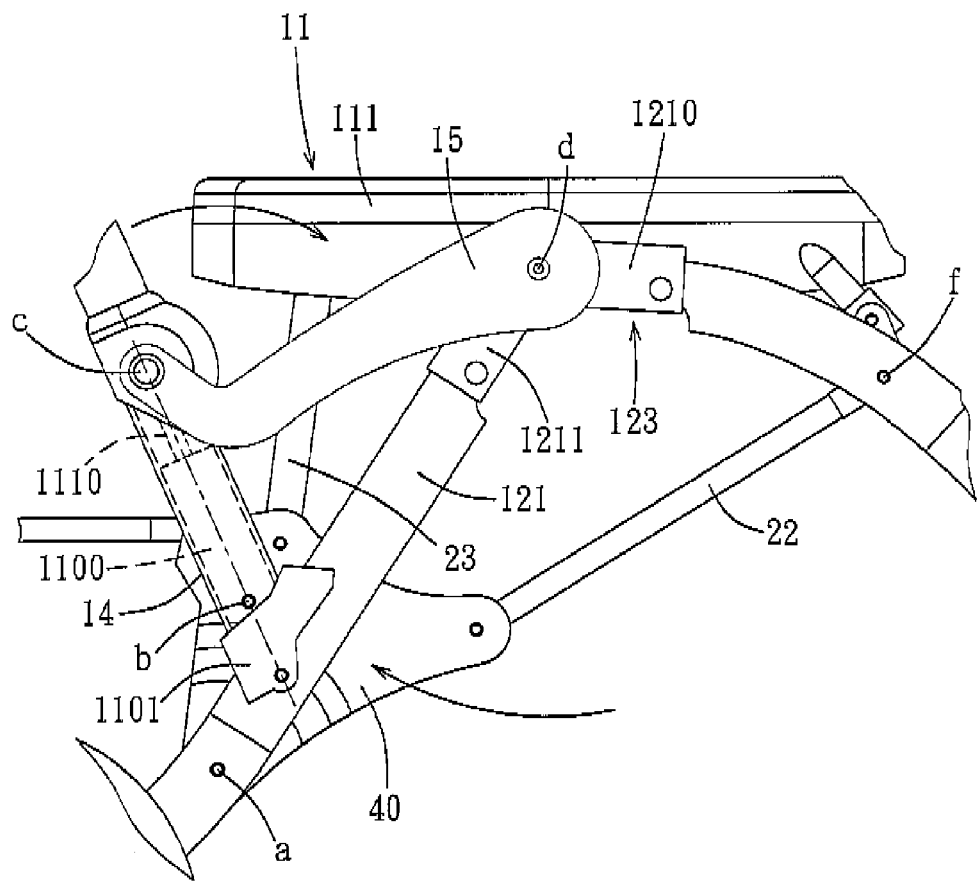
FIG. 4 is a fragmentary side view of the preferred embodiment when it is in an unfolded state.
Figure 5:
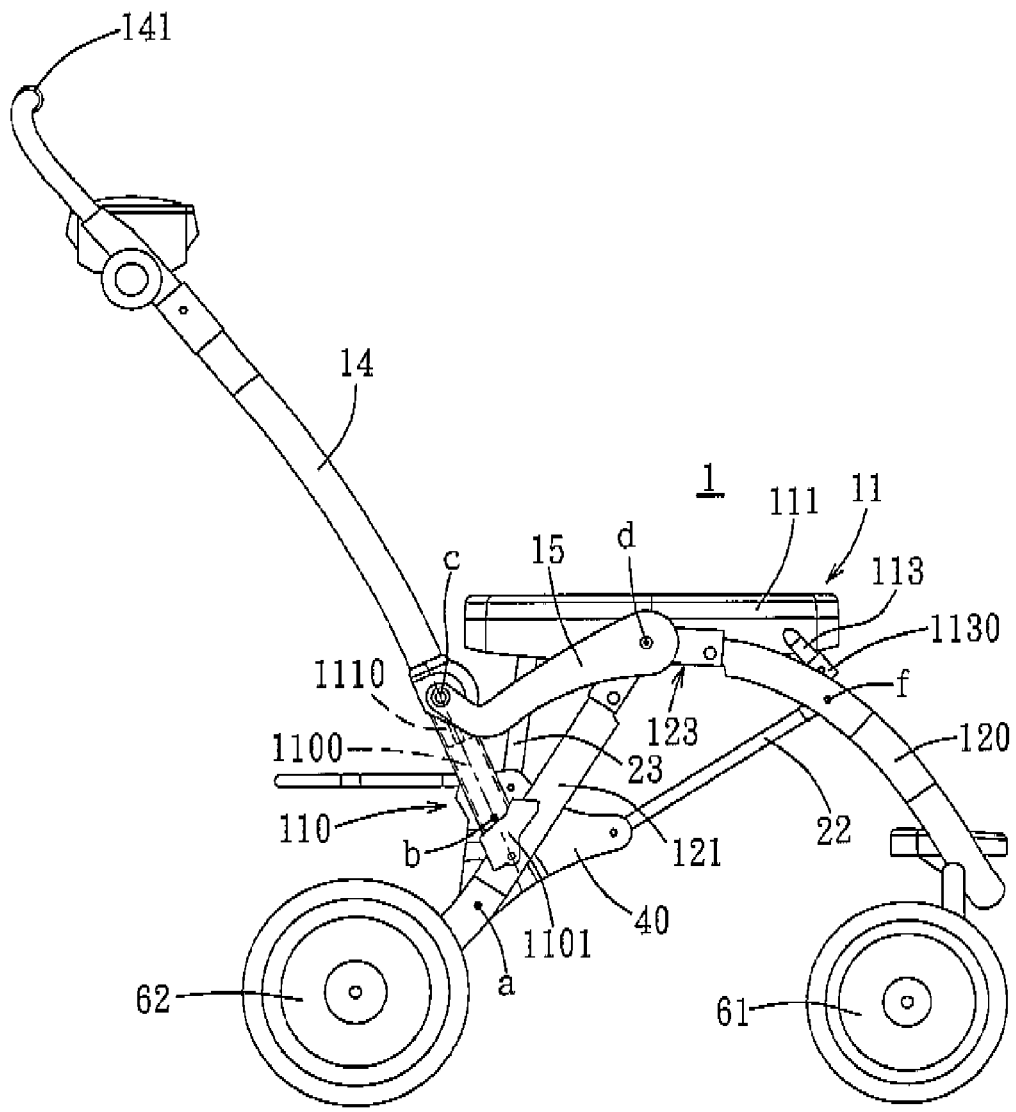
FIG. 5 is a side view of the preferred embodiment when it is in the unfolded state.

The handle tube 14 is an inverted U-shaped tube, and has two ends. With further reference to FIG. 2, each of the ends of the handle tube 14 is connected pivotally to a drive member 40 by a first pivot pin (b). Each of the ends of the rear leg tube 121 is connected pivotally to the drive member 40 by a second pivot pin (a). Each of the drive members 40 is configured as a generally triangular block. The first and second pivot pins (b, a) at the same side extend respectively through two positions of a side of the corresponding drive member 40. The rear leg tube 121 as well as the front and rear supporting tubes 22, 23 are connected respectively and pivotally to three corners of the drive member 40. Each of the links 15 is connected pivotally to the handle tube 14 by a third pivot pin (c) and to the corresponding pivotal joint 123 by a fourth pivot pin (d). Each of the second pivot joints 123 is connected to the rectangular frame body 111 of the seat frame assembly 11 by the corresponding fourth pivot pin (d). Each of the first pivot joints 1130 is connected pivotally to the front leg tube 120 by a fifth pivot pin (f). Due to arrangement of the first, second, third, fourth, and fifth pivot pins (b, a, c, d, f), during unfolding and folding operation of the stroller frame 1, the handle tube 14, the rear leg tube 121, the links 15, the front leg tube 120, the front supporting tube 22, and the rear supporting tube 23 can be pivoted relative to the drive member 40 to change relative positions thereof.

To fold the stroller frame 1, the one-hand folding mechanism 110 is first operated with one hand to remove the locking member 1100 from the lock seat 1101. Next, the ends of the handle tube 14 are rotated clockwise toward the rear leg tube 121 so that the drive members 90 rotate counterclockwise. Hence, the front supporting member 22 is moved by the drive member 40 from an inclined unfolded position to a generally horizontal folded position to thereby reduce a horizontal distance between lower ends of the front and rear leg tubes 120, 121 and move the second pivot joints 123 upwardly. At the same time, the inclination angle of each of the links 15 is changed as a result of a change in the height of the second pivot joints 123, so that the stroller frame 6 is in a fully folded state, as shown in FIG. 6, thereby reducing a width of the stroller frame 1 along a front-to-rear direction.

As such, the handle tube 14, the front and rear leg tubes 120, 121, the drive member 40, the front and rear supporting tubes 22, 23, and the links 15 constitute cooperatively an overcenter toggle linkage. During unfolding operation of the stroller frame 1, when the handle tube 14 is pulled rearwardly to a position shown in FIG. 3, the axes of the first, second, and third pivot pins (b, a, c) at the same side is on a straight line (i). After the handle tube 14 is pivoted past the position shown in FIG. 3, due to a change in the gravity of the stroller frame 1, the drive member 40 has a tendency to rotate clockwise. In other words, before the stroller frame 1 is unfolded fully, an upper end of the handle tube 14 is moved away from the ends of the rear leg tube 121 by virtue of gravity.

Upon completion of the unfolding process of the stroller frame 1, by operating the one-hand folding mechanism, the locking member 1100 is moved within the handle tube 14, and is subsequently locked on the lock seat 1101 to maintain the stroller frame 1 in the unfolded state.

During folding process of the stroller frame 1, forward pivoting movement of the upper end of the handle tube 14 results in counterclockwise rotation of the drive member 40. Hence, the positions of the seat frame assembly 11 and the front and rear leg tubes 120, 121 are changed into those shown in FIG. 6.

In view of the above, if a load is applied to the seat frame assembly 11, for example, if an infant climbs onto the stroller frame or the car safety seat disposed on the seat frame assembly 11, the stroller frame 1 will be converted toward the unfolded state due to arrangement of the overcenter toggle linkage. Thus, the object of this invention is achieved.

With this invention thus explained, it is apparent that numerous modifications and variations can be made without departing from the scope and spirit of this invention. It is therefore intended that this invention be limited only as indicated by the appended claims.

We claim:

1. A foldable stroller frame comprising:
   a seat frame assembly;
   a leg tube assembly including a front leg tube, a rear leg tube, and a pivot joint connected between said front and rear leg tubes and connected pivotally to said seat frame assembly;
   a handle tube;
   a link connected pivotally to said handle tube at one end thereof and to said pivot joint at the other end;
   two supporting tubes connected respectively to said seat frame assembly and said leg tube assembly; and
   a drive member connected pivotally among said rear leg tube, said handle tube, and said supporting tubes, in such a manner to allow for rotation;
   wherein, when said handle tube is rotated relative to said drive member, said drive member is activated to result in rotation of said seat frame and leg tube assembly, and said stroller frame is converted between unfolded and fully folded states;
   wherein one of said supporting tubes is connected pivotally to said front leg tube, and the other of said supporting tubes is connected fixedly to said seat frame assembly.

2. The foldable stroller frame as claimed in claim 1, wherein said drive member is configured as a generally triangle block, said rear leg tube and said handle tube being connected respectively and pivotally to two positions of a side of said drive member.

3. A foldable stroller frame comprising:
   a seat frame assembly;
   a leg tube assembly including a front leg tube, a rear leg tube, and a pivot joint connected between said front and rear leg tubes and connected pivotally to said seat frame assembly;
   a handle tube;
   a link connected pivotally to said handle tube at one end thereof and to said pivot joint at the other end;
   two supporting tubes connected respectively to said seat frame assembly and said leg tube assembly; and
   a drive member connected pivotally among said rear leg tube, said handle tube, and said supporting tubes, in such a manner to allow for rotation;
   wherein, when said handle tube is rotated relative to said drive member, said drive member is activated to result in rotation of said seat frame and leg tube assembly, and said stroller frame is converted between unfolded and fully folded states, and
   wherein said rear leg tube, and said supporting tubes are connected respectively and pivotally to three corners of said drive member.

4. The foldable stroller frame as claimed in claim 1, further comprising a seat frame connecting tube connected fixedly to said seat frame assembly at one end thereof and connected pivotally to said one of said supporting tubes at the other end thereof.

5. The foldable stroller frame as claimed in claim 1, wherein said pivot joint includes two connecting tubes that are interconnected pivotally and that are connected respectively and fixedly to said front and rear leg tubes.

6. The foldable stroller frame as claimed in claim 1, wherein said handle tube is connected to said drive member in such a manner that, when said stroller frame is in the unfolded state, clockwise rotation of said handle tube results in counterclockwise rotation of said drive member to move said seat frame assembly and said supporting tubes toward said handle tube.

7. The foldable stroller frame as claimed in claim 6, wherein, when said stroller frame is in the fully folded state, counterclockwise rotation of said handle tube results in clockwise rotation of said drive member to move said seat frame assembly and said supporting tubes away from said handle tube.

8. The foldable stroller frame as claimed in claim 1, wherein said seat frame assembly includes a rectangular frame body, and a mounting member disposed inside of said rectangular frame body and adapted for mounting a selected one of a stroller seat and a car safety seat on said rectangular frame body.

9. The foldable stroller frame as claimed in claim 1, further comprising a locking mechanism, said locking mechanism including a lock seat disposed on said rear leg tube, and a locking member disposed movably within said handle tube such that, when said stroller frame is in the unfolded state, said locking member is locked on said lock seat, and when said stroller frame is in the fully folded state, said locking member is removed from said lock seat.

* * * * *